Dec. 23, 1952 J. C. DENIS 2,622,904
ANGULARLY ADJUSTABLE LEVER HANDLE FOR VALVES
Filed Feb. 24, 1948 2 SHEETS—SHEET 1
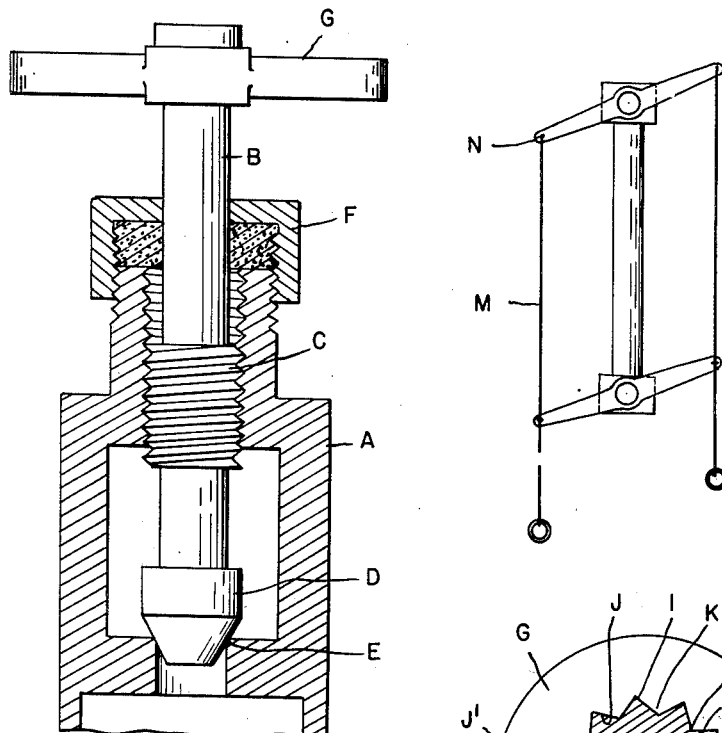
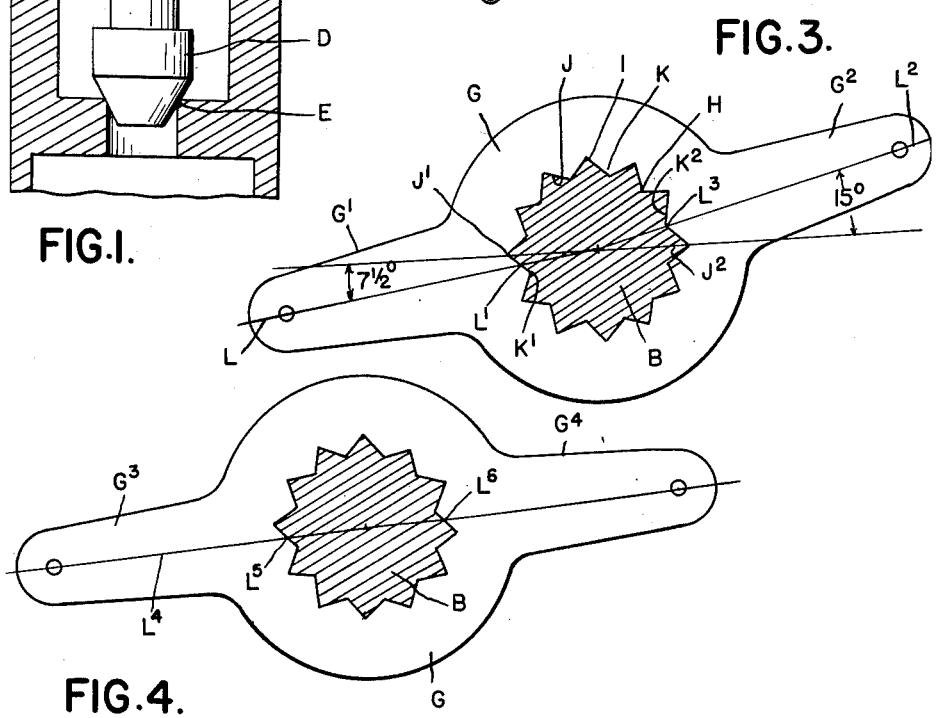
INVENTOR.
JEAN C. DENIS
BY
ATTORNEYS Dec. 23, 1952  J. C. DENIS  2,622,904
ANGULARLY ADJUSTABLE LEVER HANDLE FOR VALVES
Filed Feb. 24, 1948  2 SHEETS—SHEET 2

INVENTOR.
JEAN C. DENIS
BY
*Whittemore Hulbert + Belknap*

ATTORNEYS

Patented Dec. 23, 1952

2,622,904

UNITED STATES PATENT OFFICE 2,622,904

ANGULARLY ADJUSTABLE LEVER HANDLE FOR VALVES

Jean C. Denis, Detroit, Mich., assignor, by mesne assignments, to Buffalo-Eclipse Corporation, a corporation of New York Application February 24, 1948, Serial No. 10,293

1 Claim. (Cl. 287—53)

The invention relates to operating handles for valves and more particularly to constructions where the handle is connected to other actuating mechanisms. As a particular instance, liquid gages on boilers or other liquid holding tanks are sometimes located at such a height that the shut-off valves therefor are not directly accessible. It is therefore necessary to provide lever handles and depending chains, or other connections thereto, which are within the reach of the operator. It is obvious that the lever handle for each valve must be at such angular relation thereto, in both the open and closed positions thereof, as to be operable between such positions by the pull of the chain. However, valve handles are usually attached to the valve stems by providing the latter with a polygonal portion for engaging a correspondingly formed socket in the handle so that there are only a limited number of different angular positions of the handle relative to the stem. Also in the commercial manufacture of valves it is difficult to predetermine the exact rotative position of the stem when the valve is seated. Consequently, the lever handle when engaged with the stem may not be properly positioned.

It is the object of the instant invention to obtain a construction of a lever handle for engagement with a valve which has a larger number of different angular positions relative thereto than with constructions heretofore used.

It is a further object to increase the number of angular positions without increasing the number of faces on the stem and in the socket. With these objects in view the invention consists in the construction as hereinafter set forth.

In the drawings:

Fig. 1 is a longitudinal section through a valve to which my improved angularly adjustable lever handle is applied;

Fig. 2 is a diagram showing a water gage with a pair of shutoff valves therefor and lever handles and pull connections for operating the same;

Fig. 3 is a plan view of the lever handle in engagement with the valve stem;

Fig. 4 is a similar view of a modified construction;

As shown in Fig. 1, A is a conventional construction of valve having a stem B with a threaded portion C for engagement with the correspondingly threaded portion of the valve casing and a valve head D for engaging a seat E within the casing. The stem passes outward through a packing gland F and has attached to its outer end the handle G. Usually the portion of the stem to which the handle is attached is either square or hexagonal. With the former, the nearest angular positions of the lever handle are 90° apart and with the latter are 60°. A larger number of positions may be obtained by increasing the number of sides of the polygon, but with too great an increase the polygon approaches the circle and the attachment of the handle is not as secure.

It is one of the features of my improved handle that I substitute for the polygonal construction of stem and socket a construction having a series of V-shaped grooves with reversely turned V-shaped ribs therebetween. This permits of using a larger number in the series while still maintaining the contacting surfaces at sufficient angle for the transmission or torque and effective interlocking.

A further feature of my improved construction is in arranging the center line or axis of at least one of the arms of the lever to lie between the apices of an adjacent rib and groove. Thus if the handle is reversed from bottom to top, the said arm will be angularly displaced by a distance that is only a fraction of the displacement between adjacent ribs and grooves, thereby doubling the number of positions of angular adjustment of said arm.

A third feature of the construction is the arrangement of the opposite arm of the lever with its center line or axis passing through the common apex of an engaged rib and groove. With such construction if the handle is reversed from end to end it will give another set of positions for the last mentioned arm in addition to and different from those for the first arm obtained by reversing the handle from bottom to top.

Figure 5:
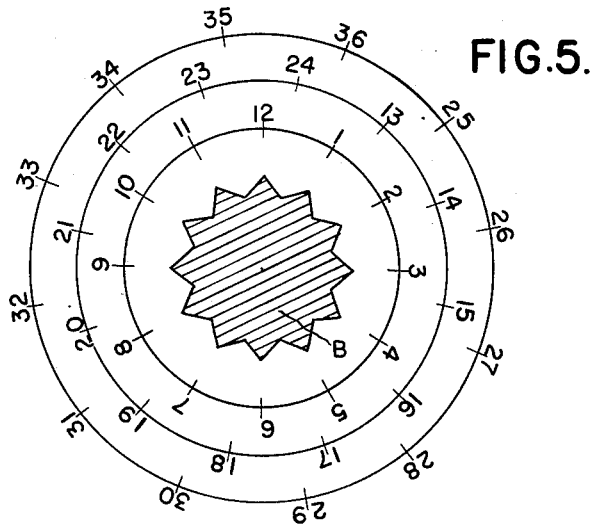
Fig. 5 is a diagram indicating the number of different angular positions of the lever handle with respect to the stem.

As specifically illustrated in Figs. 3, 4 and 5, the stem B has a series of twelve grooves H therein between which are twelve V-shaped ribs I. The lever handle G is provided with a socket having twelve grooves J for receiving the ribs I and intervening ribs K for engaging the grooves H. As shown in Fig. 3, the center line L of the lever arm G' to the left of the stem passes through a point L' which is midway between the point J' or apex of one of the grooves J and the point K' or apex of an adjacent rib K. The center line $L^2$ of the lever arm $G^2$ to the right of the stem passes through point $L^3$ which is the apex of the rib $K^2$ next adjacent to the groove $J^2$, which latter is diametrically opposite the groove having the apex $J'$. The number of different positions of angular adjustment of the arms $G'$ and $G^2$ with respect to the stem with this construction of handle are shown in Fig. 5, in which twelve positions 30° apart for the arm $G^2$ are represented by the numerals 1 to 12. Twelve other positions for the arm $G'$ spaced 10° respectively from the positions 1 to 12 are numbered 13 to 24. Twelve additional positions spaced respectively 20° from the positions 1 to 12 are obtained by reversing the handle top to bottom, and are numbered 25 to 36. Thus the maximum displacement of the lever from its desired position of adjustment is less than 10° which is negligible with an operating mechanism such as shown in Fig. 2.

Fig. 4 shows a modified construction in which the diametrically opposite lever arms $G^3$ and $G^4$ are centrally aligned with each other. This center line $L^4$ passes through a point $L^5$ corresponding to the point $L'$ in Fig. 3 and also through a point $L^6$ on the opposite side of the center. With such construction only twenty-four different positions are possible, which are obtained by reversing a lever top to bottom.

When the valve levers are connected into a mechanism such as shown in Fig. 2, the links M are connected by eyelets N in the center line of the arms of the lever and as the lever can be placed within 10° of its true position, the mechanism may be easily rendered operative.

Figure 6:
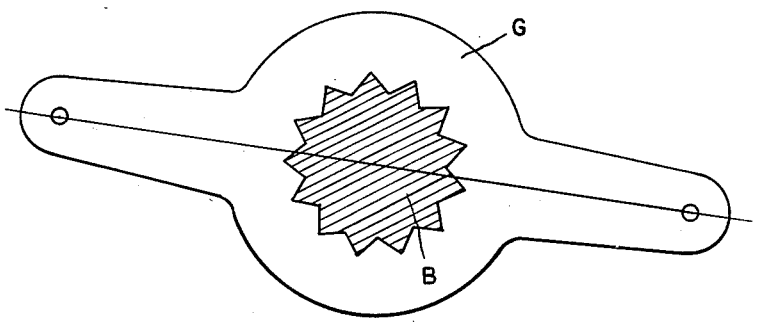
Fig. 6 is a plan view of the lever handle in engagement with the valve stem showing another modification.

Another modified construction is illustrated in Fig. 6 in which the number of grooves and engaging ribs is odd instead of even, as for instance 13. This will double the number of angular positions of the lever by reversing it from end to end even though the two arms of the lever on opposite sides of the center are in alignment with each other as illustrated in this figure.

What I claim as my invention is:

An angularly adjustable operator for valve stems comprising a lever having a socket extending therethrough and provided with a series of equispaced ribs with intermediate grooves for engaging complementary elements of the valve stem in a series of different positions of the said lever equal in number to the ribs, said lever having arms extending on opposite sides of the axis of said stem, and the central longitudinal axis of at least one of said arms being intermediate a rib and a groove to provide on reversal of the lever an additional equal number of adjustment positions intermediate those of the first series.

JEAN C. DENIS.

REFERENCES CITED

The following references are of record in the file of this patent:

UNITED STATES PATENTS

| Number | Name | Date |
|---|---|---|
| 1,145,587 | Hitchcock | July 6, 1915 |
| 1,391,012 | Schulder | Sept. 20, 1921 |
| 1,914,260 | Kennedy | June 13, 1933 |
| 1,990,990 | Hathorn | Feb. 12, 1935 |
| 2,290,249 | Piperoux | July 21, 1942 |